United States Patent [19]

Suzuki

[11] Patent Number: 5,487,628
[45] Date of Patent: Jan. 30, 1996

[54] DEVICE FOR PREVENTING CUTTING FLUID FROM ENTERING A BEARING ON A SPINDLE IN A MACHINE TOOL

[75] Inventor: Ryuji Suzuki, Yamanashi, Japan

[73] Assignee: Fanuc Ltd., Yamanashi, Japan

[21] Appl. No.: 356,549

[22] Filed: Dec. 15, 1994

[30] Foreign Application Priority Data

Dec. 16, 1993 [JP] Japan ..................... 5-316892

[51] Int. Cl.$^6$ ................................. B23Q 11/00
[52] U.S. Cl. ..................... 409/135; 408/56; 409/137; 409/231
[58] Field of Search ................... 409/135, 137, 409/231, 233; 408/56

[56] References Cited

U.S. PATENT DOCUMENTS

| | | | |
|---|---|---|---|
| 3,555,962 | 1/1971 | Wolf et al. | 409/231 |
| 4,951,578 | 8/1990 | von Haas et al. | 409/231 |
| 5,290,130 | 3/1994 | Beretta | 409/231 |

FOREIGN PATENT DOCUMENTS

| | | | |
|---|---|---|---|
| 8450 | 1/1992 | Japan | 409/231 |
| 1458108 | 2/1989 | U.S.S.R. | 409/135 |

Primary Examiner—Daniel W. Howell
Attorney, Agent, or Firm—Nikaido, Marmelstein, Murray & Oram

[57] ABSTRACT

A machine tool comprises a spindle head (2) having a vertical bore (2a); a spindle (20) provided in said vertical bore (2a) and including a tapered hole (24) at the lower end of said spindle (20); bearing means (22a) provided in said vertical bore (2a) for rotatably supporting said spindle (20); a non-contact sealing means (10a) for sealing the bearing means (22a). The machine tool further comprises a device for preventing a cutting fluid from entering the bearing for the spindle. The device comprises means (6a, 6b) for forming a pressure chamber (6) provided so as to enclose the non-contact sealing means (10a); and means (44) for supplying air to the pressure chamber (6).

11 Claims, 2 Drawing Sheets

DEVICE FOR PREVENTING CUTTING FLUID FROM ENTERING A BEARING ON A SPINDLE IN A MACHINE TOOL

BACKGROUND OF THE INVENTION (1) Field of the Invention

The invention relates to a sealing device for a bearing in a machine tool, in particular, to a device for preventing cutting fluid from entering a bearing on a spindle in a machine tool.

(2) Description of the Related Art

A machine tool, such as a CNC drilling machine, is often installed in an environment where a large quantity of a mist or small droplets of cutting fluid are generated by a cutting process and float in the air. This occurs in particular, where the cutting process is performed at high speed. A cutting process at a high speed requires even more cutting fluid than usual, and this results in more mist or droplets floating in the air around the machine tool. If cutting fluid, even in the form of mist, enters a bearing rotatably supporting a spindle of the machine tool, the cutting fluid can dilute the grease in the bearing and flows out therefrom. Rust can then appear in the bearing.

In the prior art, the bearings on the spindle in a machine tool are sealed, to prevent cutting fluid from entering the bearings, by an oil seal or a mechanical seal, in order to keep the bearing clean.

However, the spindle of the machine tool rotates at a high speed and generates much heat, whereby the air around the bearing is heated. The heated air cools when the spindle is stopped. Thus, the air around the bearing expands and contracts at each change in the air temperature. In order to compensate for the expansion and contraction of the air around the bearing, the machine tool is provided with a labyrinth seal around the bearing. A labyrinth seal is a clearance or non-contact sealing means having a stationary member and a rotating member. In a labyrinth seal, which is generally used for sealing the bearing in the machine tool, the stationary and rotating members have surfaces which face to each other and are positioned perpendicular to the rotating axis. The members include a plurality of concentric circular channels and lands alternatively provided on the respective surfaces. The stationary and rotating members are combined so that the circular channels and lands on one of the members match with the lands and channels on the other member, and a clearance, which allows air to pass through the labyrinth seal, is made between the members. When the rotating member rotates at a high speed, the air within the clearance flows with the rotating member due to the viscosity. Therefore, a centrifugal force, which acts on the air flow, moves the air in the radially outward direction. Thus, the labyrinth seal, during rotation at a high speed, prevents the mist of cutting fluid from entering the bearing.

The labyrinth seal, however, does not rotate when the spindle is stopped. Thus, the labyrinth seal does not function when the spindle is stopped. While the spindle is rotating, a vacuum appears inside the labyrinth seal. When the spindle stops, air moves through the seal to release the vacuum. A mist of cutting fluid can be drawn through the seal by the flow of air.

In addition to the above, when the air around the bearing cools, more air is drawn to the bearing due to the contraction of the air around the bearing. A mist of cutting fluid can enter the bearing, through the labyrinth seal, with the air flow. In particular, a machine tool, such as a CNC drilling machine, comprises a vertical spindle and a spindle head supporting the spindle, and a mist of cutting fluid often forms condense on the top surface of the spindle head. When the labyrinth seal is stopped, the standing cutting fluid on the top surface of the spindle head may be drawn to the bearing, through the clearance in the labyrinth seal, as a flood of cutting fluid.

In the prior art, there is a device for preventing cutting fluid from entering the bearings by supplying pressurized air into the bearing.

When the pressurized air is supplied into the bearing, the grease can be forced out from the bearing by the air pressure. Moreover, a further problem is that the quality of the air supplied in the bearing must be tightly controlled by completely removing moisture and dust therefrom.

SUMMARY OF THE INVENTION

The object of the invention is to solve the above problems in the prior art, and to provide a device for preventing cutting fluid from entering a bearing through a labyrinth seal by forming a pressurized air region which forces the cutting fluid from the space adjacent the labyrinth seal.

The invention provides a device for preventing cutting fluid from entering a bearing rotatably supporting a spindle in a machine tool. The device comprises means for forming a pressure chamber enclosing a region adjacent to the bearing; and means for supplying air to the pressure chamber to increase the pressure within the pressure chamber.

The machine tool preferably has a labyrinth seal provided outside and adjacent to the bearing for sealing the bearing, and the pressure chamber is arranged to enclose a region outside the labyrinth seal.

In the preferred embodiment, the air supplying means comprises a nozzle having an end positioned inside the pressure chamber; and an air source communicating with the nozzle, through a conduit, in order to increase the pressure within the pressure chamber.

The invention further provides a machine tool which comprises a spindle head being movable in the vertical direction and having a vertical bore; a spindle provided in the vertical bore and including a tapered hole at the lower end of the spindle adapted to engage a tapered shank of a tool holder to be mounted on the spindle; bearing means provided in the vertical bore for rotatably supporting the spindle; a non-contact sealing means, for sealing the bearing means, which is provided on the outside of the bearing means; means for forming a pressure chamber provided so as to enclose the non-contact sealing means; and means for supplying air to the tapered hole of the spindle, which means supplies higher pressure air when the tool holder is not fitted into the tapered hole, and lower pressure air when the tool holder is fitted into the tapered hole.

In the preferred embodiment, the spindle further includes an air passage communicating with the tapered hole, and the air supplying means comprises an air nozzle having an end for discharging air positioned within the pressure chamber, a link to move the nozzle such that the end is communicated with the air passage when the tool holder is not fitted into the tapered hole, an air source for generating compressed air, and a conduit having a control valve and connecting the air source to the nozzle.

The air supply means further comprises an orifice conduit with an orifice. The orifice conduit is connected to the air conduit so as to bypass the control valve, and the control valve is a solenoid operated valve which opens when the tool holder is not fitted into the tapered hole, and closes when the tool holder is fitted into the tapered hole.

In another embodiment of the invention, the control valve is a solenoid operated control valve having two positions of which one is a normal position allowing air to pass through the valve without substantial pressure drop, and the other is an orifice position which reduces the pressure of air passing through the valve.

DESCRIPTION OF THE PREFERRED EMBODIMENTS

The preferred embodiment of a device for preventing cutting fluid from entering a bearing according to the invention is described with reference to the drawings in which the device is applied to a CNC drilling machine as an example. The CNC drilling machine comprises an automatic tool changer (not shown) to form a machining center. The automatic tool changer has a tool magazine (not shown) containing a plurality of tools. The tools are fitted into the respective tool holders (not shown) and arranged on the tool magazine along a circle. When a tool is changed, a spindle head 2 is moved in the vertical direction. The automatic tool changer, which is interlocked with the movement of the spindle head, swings to change a tool mounted on a spindle 20 of the CNC drilling machine with a tool contained within the tool magazine.

Figure 1:
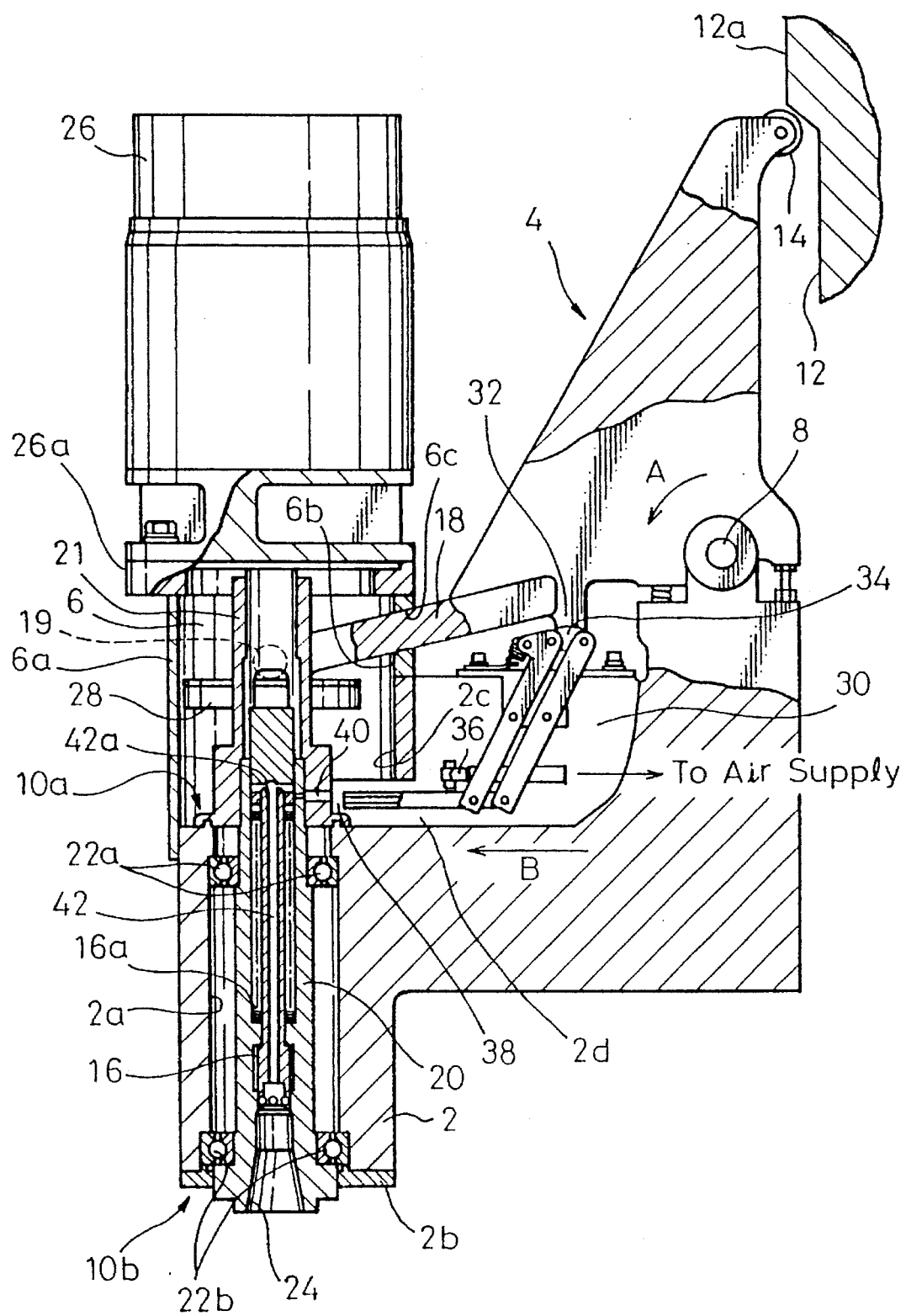
FIG. 1 is a partial section of a preferred embodiment of the invention of a device for preventing cutting fluid from entering a bearing which is applied to a CNC drilling machine.

In FIG. 1, the spindle 20 of the CNC drilling machine is provided in a bore 2a in the spindle head 2. The spindle 20 is supported for rotation at the opposite ends thereof by a pair of ball bearings 22a and 22b arranged between the spindle 20 and the inner surface of the bore 2a. The spindle 20 is rotated by an electrical driving motor 26 which is mounted on the spindle head 2 by a flange 26a. The shaft of the driving motor 26 is connected to the spindle 20 by a joint 21. The bore 2a is closed at the top end by the lower portion of the joint 21, and at the lower end by an end cap 2b. Labyrinth seals 10a and 10b are provided between the lower portion of the joint 21 and the spindle head 2, and between the end cap 2b and the the spindle head 2. Thus, while the spindle 20 is rotating, air is drawn from inside the bore 2a by the labyrinth seals 10a and 10b, whereby the dust and the cutting fluid mist in the surroundings are prevented from entering the bore 2a.

The top labyrinth seal 10a is enclosed by covers 6a and 6b which form a pressure chamber 6. The cover 6a is arranged to cover the spindle head 2 and the flange 26a at the front and side of the CNC drilling machine. The cover 6b is arranged to cover a rib 2c on the spindle head 2 and the flange 26a at the back of the CNC drilling machine. The cover 6b includes an opening 6c for an arm 18 of a bell crank 4 as described hereinafter.

The covers 6a and 6b may be made from a plate of metal, plastic or synthetic rubber. In case of a metallic plate, carbon steel or stainless steel can be used. In case of a plastic plate, oil proof vinyl chloride or polycarbonate can be used. In case a rubber plate, oil proof NBR rubber (acrylonitrilebutadiene rubber) or NBR sponge can be used. The covers 6a and 6b are secured to the spindle head 2 by appropriate means such as screws (not shown). The covers 6a and 6b are provided to enclose the pressure chamber 6 such that the pressure within the pressure chamber 6 can be high compared to the surroundings, and are not required to completely seal the pressure chamber 6.

The spindle 20 includes a tapered hole 24 at its lower end in which the tapered shank of a tool holder is fitted. The tool for machining is mounted into the tapered hole 24 via the tool holder so as to be aligned with the spindle 20. The spindle 20 is a tubular cylindrical member in which a draw bar 16, which is upwardly biased by a belleville spring 16a, is provided so as to move in the vertical direction. The draw bar 16 lifts the tool holder by engaging with a pull stud on the top of the tapered shank of the tool holder when the tool holder is fitted into the tapered hole 24. A receiving portion 28 is provided at the top of the draw bar 16. As described hereinafter, the receiving portion 28 comprises, as an example, bar members and engages a roller 19 of the bell crank 4.

The bell crank 4 is rotatably mounted about a shaft 8 on the top of the spindle head 2. The bell crank 4 has an arm 18 to depress the draw bar 16, and a cam roller 14 at the top thereof. The arm 18 has a roller 19 for engaging the receiving portion 28 of the draw bar 16. When the bell crank 4 rotates in the direction indicated by an arrow A in FIG. 1, the arm 18 moves through the opening 6c in the cover 6b and engages the receiving portion 28 of the draw bar 16 through the roller 19.

The rotational movement of the bell crank 4 is controlled by engagement between the cam roller 14 and bell crank cam 12 provided on a column of the CNC drilling machine. When the bell crank 4 is lifted for changing the tools, the cam roller 14 contacts the raised portion 12a, whereby the bell crank 4 rotates in the direction A.

In the machining center having an automatic tool changer, the tapered hole 24 is cleaned by supplying compressed air to the tapered hole 24 in order to obtain good fit between the tapered hole 24 and the tapered shank of the tool holder. The compressed air for cleaning is supplied by an air source 46 (FIG. 2) through a nozzle 36. The nozzle 36 is inserted into the pressure chamber 6 through a nozzle opening 2d in the spindle head 2. The nozzle 36 is provided with a link 30 which is operated by the bell crank 4. The link 30 has a follower cam 34 engaging a cam 32 provided on the bell crank. When the spindle head 2 moves upwardly and the bell crank 4 rotates in the direction A as tools are changed, the cam 32 on the bell crank 4 depresses the follower cam 34, which causes in the nozzle 36 to be moved in the direction B through the link 30. Thus, the end 38 of the nozzle 36 abuts the outer surface of the joint 21.

The draw bar 16 includes an air passage 42, which is communicated with the tapered hole 24, along the center axis thereof for supplying air from the nozzle 36 to the tapered hole 24. The air passage 42 has a plurality of radial passages 42a at the top. The joint 21 includes a connection passage 40. The connection passage 40 can be communicated with the radial passages 42a when the draw bar 16 is lowered. Thus, when the draw bar 16 is lowered as tools are changed, an air supply passage is formed from the air source to the tapered hole 24.

Figure 2:
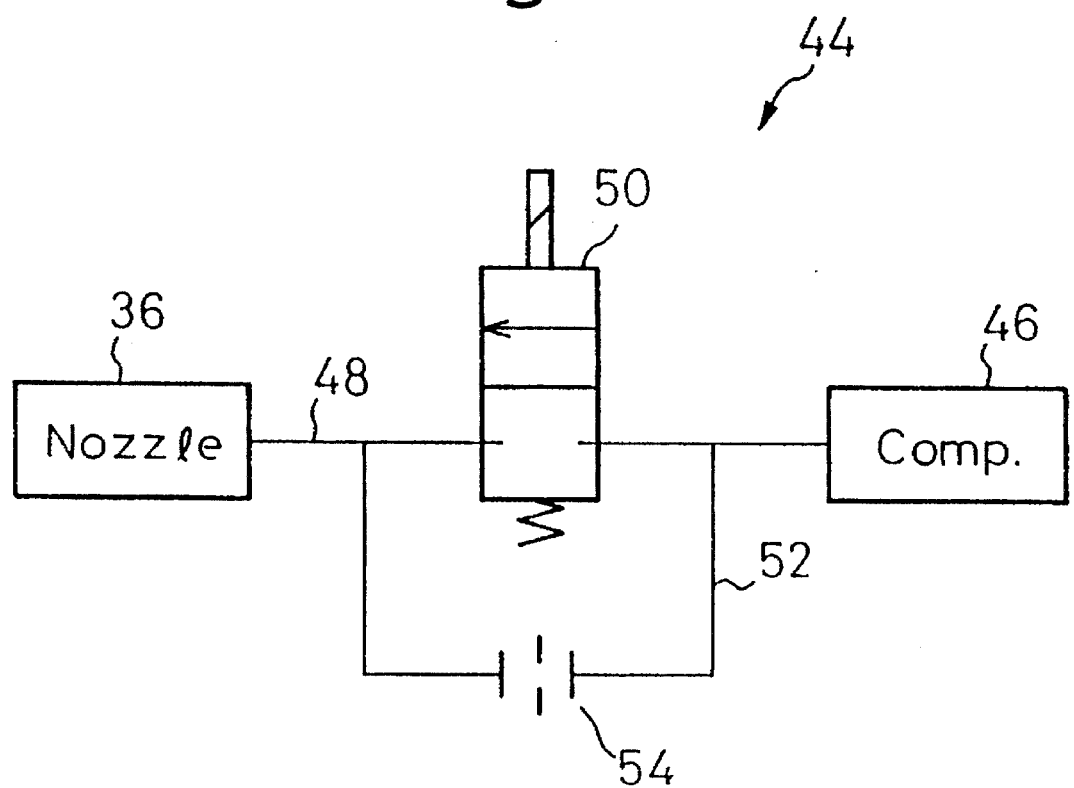
FIG. 2 illustrates a block diagram of an embodiment of an air supplying device.

Referring to FIG. 2, an air supplying device 44 of an embodiment of the invention is described. The air supplying device 44 comprises an air compressor 46 as an air source. The air compressor 44 is connected to the nozzle 36 by a conduit 48 on which a solenoid operated valve 50 with a solenoid is provided. The valve 50 controls the air supply through the conduit 48 when the solenoid is activated or deactivated. The valve 50 is closed when the solenoid is deactivated, and the valve 50 is opened when the solenoid is activated, whereby the air from the compressor 46 is supplied to the nozzle 36 through the conduit 48 and the valve 50. The solenoid is electrically connected to a controller (not shown) of the CNC drilling machine. The controller activates the solenoid to open the solenoid operated valve when the nozzle 36 abuts the joint 21 during a tool change.

The air supply device 44 further comprises an orifice conduit 52 with an orifice 54. The orifice conduit 52 is connected to the conduit 48 so as to bypass the solenoid operated valve 50. When the valve 50 is closed, the air from the compressor 46 is supplied to the nozzle 36 through the orifice 54 which reduces the pressure of the supplied air. Thus, the air flow to the nozzle 36 is controlled by the solenoid operated valve 50 and the orifice 54. The condition of the air from the compressor 46 is controlled to a certain quality by a filter and a dryer (not shown).

The size of the opening of the orifice 54 is selected to obtain the desired pressure within the pressure chamber 6 after considering the leakage therefrom. The pressure within the pressure chamber 6 is set such that the pressure does not obstruct the sealing function of the labyrinth seal 10a. A labyrinth seal discharges air by the differential pressure generated by the rotation thereof. In FIG. 1, the labyrinth seals 10a and 10b draw air from the inside of the bore 2a when the spindle 20 rotates. The pressure within the pressure chamber 6 is controlled such that it is slightly higher than ambient pressure. A slightly higher pressure compared with ambient pressure can prevent the cutting fluid mist from entering the pressure chamber 6 through the opening and clearance.

As the automatic tool changer starts its operation, the spindle head 2 is lifted, and the bell crank 4 rotates about the shaft 8 in the direction A due to the engagement between the cam roller 14 and the raised portion 12a of the bell crank cam 12, which causes the roller 19 on the end of the arm 18 of the bell crank 4 to engage with and depress the receiving portion 28 of the draw bar 16 as shown in FIG. 1. When the draw bar 16 is lowered, the radial passage 42a communicates with the connection passage 40. On the other hand, when the spindle head 2 is lifted, the cam 32 of the bell crank 4 depresses the follower cam 34 of the link 30, which causes the nozzle 36 to be moved in the direction B. Thus, the end 38 of the nozzle 36 abuts against the outer surface of the joint 21. At this time, the controller activates the solenoid to open the solenoid operated valve 50. Thus, pressurized air for cleaning the tapered hole 24 is supplied to the tapered hole 24.

When a tool holder (not shown) is fitted into the tapered hole 24, the spindle head 2 is lowered, and the bell crank 4 rotates in a direction opposite to the direction A. Thus, the arm 18 of the bell crank 4 is retracted and the draw bar 16 is lifted by the belleville spring 16a. At the same time, the depression of the follower cam 34 is no longer depressed by the cam 32 of the bell crank 4, and this allows the nozzle 36 to be retracted. Addition to the above, the controller deactivates the solenoid to close the solenoid operated valve 50. Thus, the pressure of air from the compressor 46 is reduced as it is only supplied to the pressure chamber 6 through the orifice conduit 52 and the orifice 54. The air supplied to the pressure chamber 6 passes through the nozzle opening 2d and the clearance between the opening 6c of the cover 6b and the arm 18. However, the pressure within the pressure chamber 6 is increased to a level higher than that outside the chamber 6. This prevents the the cutting fluid mist around the CNC drilling machine from entering the pressure chamber 6, that is, the region adjacent to the labyrinth seal 10a, therefore, the cutting fluid cannot enter the ball bearing 22a through the clearance in the labyrinth seal 10a when the spindle 20 is stopped.

The cutting fluid is not prevented from entering the labyrinth seal 10b when the spindle 20 is stopped. However, the cutting fluid passing through the labyrinth seal 10b cannot reach the ball bearing 22b since the ball bearing 22b is positioned above the labyrinth seal 10b, and the cutting fluid pools inside the labyrinth seal 10b. The cutting fluid inside the labyrinth seal 10b is ejected when the spindle 20 rotates.

Figure 3:
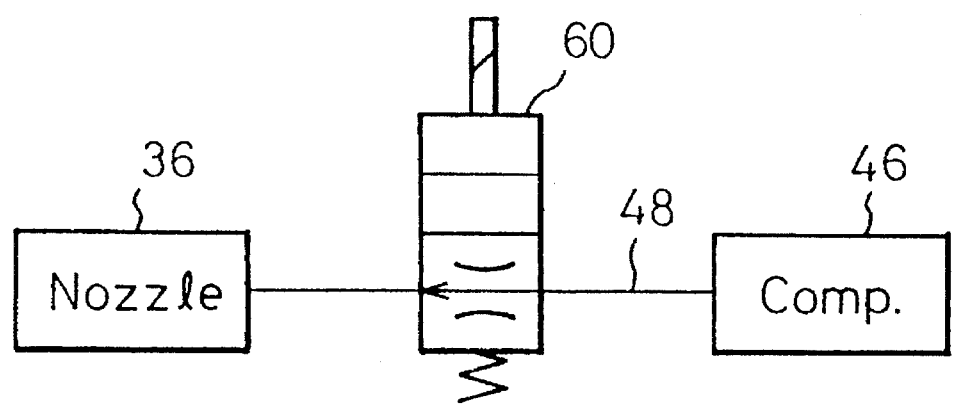
FIG. 3 illustrates a block diagram of another embodiment of an air supplying device.

FIG. 3 illustrates another embodiment of the air supplying device, in which the solenoid operated valve 50 of the preceeding embodiment is replaced by a two-position solenoid operated valve 60 consisting of a normal position and an orifice position, and the orifice conduit 52 and the orifice 54 are removed. The solenoid of the solenoid operated valve 60 is controlled for selecting the position thereof by the controller for the CNC drilling machine. When the solenoid operated valve 60 is in the orifice position, the flow rate of air to the nozzle 36 is reduced.

The invention is described as only a preferred embodiment and it should be understood the invention can be changed and improved within the scope and spirits of the invention.

For example, in FIG. 1, the CNC drilling machine is shown. However, the invention can be applied to any other machine tool having a vertical spindle, such as a vertical milling machine or a radial drilling machine. The pair of ball bearings 22a and 22b for the spindle 20 may be replaced by a pair of roller bearings. In the described embodiment, in order to increase the pressure within the pressure chamber 6, the cleaning device for the tapered hole 24, which comprises the nozzle 36 and the air supply device 44, is used. However, a separate air supply device may be provided to increase the pressure within the pressure chamber 6. Furthermore, the compressor 46 can be replaced by a fan or blower as an air source.

In FIG. 1, the pressure chamber 6 is arranged so as to enclose a relatively large region between the spindle head 2 and the flange 26a for securing the driving motor 26. However, the pressure chamber 6 can be formed to enclose the smaller region adjacent to the labyrinth seal 10a. Furthermore, a device for preventing cutting fluid from entering a bearing of the invention can be also provided on the lower labyrinth seal 10b.

What is claimed is:

1. A device for preventing cutting fluid from entering a bearing rotatably supporting a spindle in a machine tool, comprising means for forming a pressure chamber enclosing a region adjacent to said bearing; and means for supplying air to said pressure chamber to increase the pressure within said pressure chamber.

2. The device according to claim 1, in which said machine tool has a labyrinth seal provided outside and adjacent to said bearing for sealing said bearing; and said pressure chamber being arranged to enclose a region outside of said labyrinth seal.

3. The device according to claim 1, in which said air supply means comprises a nozzle having an end positioned inside the pressure chamber; and an air source communicating with said nozzle through a conduit in order to increase the pressure within said pressure chamber.

4. A machine tool comprising;

a spindle head being movable in the vertical direction and having a vertical bore;

a spindle provided in said vertical bore and including a tapered hole at the lower end of said spindle adapted to engage a tapered shank of a tool holder to be mounted on said spindle;

bearing means provided in said vertical bore for rotatably supporting said spindle;

a non-contact sealing means for sealing said bearing means, said non-contact sealing means being provided outside said bearing means;

means for forming a pressure chamber provided so as to enclose said non-contact sealing means; and means for supplying air to said tapered hole of said spindle, which means supplies high pressure air when said tool holder is not fitted into said tapered hole, and low pressure air when said tool holder is fitted into said tapered hole.

5. The machine tool in accordance with claim 4 in which said spindle further includes an air passage communicating with said tapered hole;

said air supply means comprising an air nozzle having an end for discharging air positioned within said pressure chamber, a link to move said nozzle such that said end is communicated with said air passage when said tool holder is not fitted into said tapered hole, an air source for generating compressed air, and a conduit having a control valve and connecting said air source to said nozzle.

6. The machine tool in accordance with claim 5 in which said air supply means further comprises an orifice conduit with an orifice, said orifice conduit being connected to said air conduit so as to bypass said control valve; and said control valve being a solenoid operated valve which opens when said tool holder is not fitted into said tapered hole, and closes when said tool holder is fitted into said tapered hole.

7. The machine tool in accordance with claim 5 in which said control valve is a solenoid operated control valve having two positions of which one is a normal position allowing air to pass through said valve without a substantial pressure drop, and the other is an orifice position which reduces the pressure of the air passing through said valve.

8. The machine tool in accordance with claim 5 in which said air source comprises an air compressor.

9. The machine tool in accordance with claim 4 in which said means for forming said pressure chamber comprises a cover of a metallic material enclosing a region adjacent said labyrinth seal.

10. The machine tool in accordance with claim 4 in which said means for forming said pressure chamber comprises a covers of a plastic material enclosing a region adjacent said labyrinth seal.

11. The machine tool in accordance with claim 4 in which said means for forming said pressure chamber comprises a cover of a rubber material enclosing a region adjacent said labyrinth seal.

* * * * *